United States Patent [19]

Mathis et al.

[11] 4,104,233

[45] Aug. 1, 1978

[54] ω-BROMOALKYL PLASTICIZER COMPOSITIONS

[75] Inventors: Thomas C. Mathis, St. Louis, Mo.; Albert W. Morgan, Collinsville, Ill.; William Vanderlinde, St. Louis, Mo.

[73] Assignee: Monsanto Company, St. Louis, Mo.

[21] Appl. No.: 710,976

[22] Filed: Aug. 2, 1976

Related U.S. Application Data

[63] Continuation-in-part of Ser. No. 642,965, Dec. 22, 1975, abandoned.

[51] Int. Cl.$^2$ .............................................. C08K 5/11
[52] U.S. Cl. .......................... 260/31.8 HA; 260/408; 252/8.1
[58] Field of Search ................. 260/31.8 HA, 485 H, 260/408

[56] References Cited

U.S. PATENT DOCUMENTS

| | | | |
|---|---|---|---|
| 2,302,743 | 11/1942 | Carruthers | 260/31.8 HA |
| 2,314,454 | 3/1943 | Manchen | 260/408 |
| 2,525,961 | 10/1950 | Shugar | 260/485 H |
| 3,256,305 | 6/1966 | Gijzen | 260/485 H |

*Primary Examiner*—Paul R. Michl
*Attorney, Agent, or Firm*—George R. Beck; Robert E. Wexler; Edward P. Grattan

[57] ABSTRACT

Smoke and flame retardant plasticizer compositions for polymers comprising ω-bromoalkyl esters of saturated aliphatic dicarboxylic acids. Optionally, the composition may contain a modifier which is an oxide, hydroxide, hydrate or salt of antimony, aluminum, calcium or magnesium.

11 Claims, No Drawings

ω-BROMOALKYL PLASTICIZER COMPOSITIONS

RELATIONSHIP TO PRIOR APPLICATIONS

This application is a continuation-in-part of copending application Ser. No. 642,965 filed Dec. 22, 1975 and now abandoned.

BACKGROUND OF THE INVENTION

1. Field of the Invention

This invention relates to novel ω-bromoalkyl esters and to flame and smoke retardant plasticizer compositions for vinyl halide polymers which comprise ω-bromoalkyl esters of saturated aliphatic dicarboxylic acids.

Additionally, this invention relates to flame and smoke retardant plasticizer compositions for vinyl halide polymers which comprise an ω-bromoalkyl ester of an aliphatic dicarboxylic acid and a metal compound modifier.

Further, the invention relates to vinyl halide polymer compositions containing the disclosed flame and smoke retardant plasticizer compositions.

2. Prior Art

Applicants are aware of the following patents which may be relevant to the compositions of the present invention:

U.S. Pat. No. 2,302,743 discloses di(chloroethyl) succinate as a plasticizer for cellulose esters, alkyds and vinyl resins.

U.S. Pat. No. 2,525,961 discloses the preparation of plasticizers, for cellulose esters and alkyds and vinyl resins, which may be chlorobutyl esters of certain acids, including, succinic acid and adipic acid.

U.S. Pat. No. 3,256,305 discloses the use of haloaliphatic esters of carboxylic acids, e.g. succinic and sebacic acids, as plasticizers for plastics.

Additionally, prior art publications disclose the use of metal oxides, hydroxides, salts and hydrates as components of flame retardant compositions.

SUMMARY OF THE INVENTION

In accordance with the present invention, there are provided flame and smoke retardant plasticizer compositions for vinyl halide polymers which comprise an ω-bromoalkyl ester of a saturated aliphatic dicarboxylic acid having from 5 to 9 carbon atoms. Such compositions show unexpected improvement in smoke and flame retardation effectiveness as compared to known prior art chloroalkyl-containing plasticizers, e.g., bis(4-chlorobutyl) adipate.

Further, the present invention provides compositions comprising an ω-bromoalkyl ester of a dicarboxylic acid and a metal compound modifier. Additionally, the present invention provides compositions comprising a vinyl halide polymer and a flame retardant plasticizer composition described above and hereinafter.

SPECIFIC EMBODIMENTS OF THE INVENTION

The main objective of the present invention is to provide novel smoke and flame retardant plasticizer compositions for vinyl halide polymers, said compositions comprising a bis(107-bromoalkyl) ester of a saturated aliphatic dicarboxylic acid, alone or in conjunction with conventional plasticizers and/or a modifier metal compound.

The smoke and flame retardant plasticizers which are embodied by the present invention are based on aliphatic dicarboxylic acids and are represented by the formula

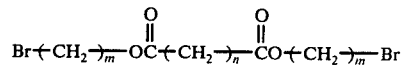

wherein $m$ represents an integer from 1 to 8 and $n$ represents an integer from 3 to 7.

Illustrative bis(ω-bromoalkyl) esters contemplated as being within the scope of the above formula are the ω-bromoalkyl esters of glutaric, adipic, pimelic, suberic and azelaic acids. Preferably, the above formula encompasses bis(ω-bromoalkyl) esters wherein $n$ represents an integer from 4 to 6, i.e., the esters of adipic, pimelic and suberic acids. In particular, the above formula encompasses the bis(ω-bromoalkyl) esters of adipic acid.

Illustrative bis(ω-bromoalkyl) esters of the described acids are the bis(bromomethyl) ester, the bis(2-bromoethyl) ester, the bis(3-bromopropyl) ester, the bis(4-bromobutyl) ester, the bis(5-bromopentyl) ester, the bis(6-bromohexyl) ester, the bis(7-bromoheptyl) ester and the bis(8-bromooctyl) ester.

Illustrative bis(ω-bromoalkyl) esters of the above-described aliphatic dicarboxylic acids which are embodied by the present invention include bis(3-bromopropyl) glutarate, bis(7-bromoheptyl) glutarate, bis(bromomethyl) adipate, bis(2-bromoethyl) adipate, bis(3-bromopropyl) adipate, bis(4-bromobutyl) adipate, bis(5-bromopentyl) adipate, bis(6-bromohexyl) adipate, bis(7-bromoheptyl) adipate, bis(8-bromooctyl) adipate, bis(2-bromoethyl) pimelate, bis(3-bromopropyl) pimelate, bis(4-bromobutyl) pimelate, bis(3-bromopropyl) suberate, bis(4-bromobutyl) suberate, bis(6-bromohexyl) suberate, bis(2-bromoethyl) azelate, bis(4-bromobutyl) azelate and the like. Especially preferred is bis(4-bromobutyl) adipate.

The ω-bromoalkyl esters of aliphatic dicarboxylic acids may be prepared by reaction of the appropriate acid anhydride, e.g., adipic anhydride, with an appropriate molar amount of an alkylene bromohydrin. For example, bis(4-bromobutyl) adipate may be prepared by reaction of adipic anhydride with tetramethylene bromohydrin in a molar ratio of 1:2. Alternatively, the ω-bromoalkyl esters may be prepared by reaction of, for example, tetramethylene oxide and adipoyl dibromide to afford bis(4-bromobutyl) adipate. Still further, the esters may be prepared by reaction of the appropriate acid, e.g., adipic acid, with the appropriate brominated alcohol, e.g., 4-bromobutanol.

The metal modifier compound, which may be used in conjunction with the ω-bromoalkyl esters, is selected from the group consisting of Dawsonite, i.e., $Al_2(CO_3)_3 \cdot Na_2CO_3 \cdot nH_2O$, or an oxide, hydroxide, hydrate or salt of a metal selected from the group consisting of antimony, aluminum, calcium and magnesium and mixtures thereof.

Illustrative metal oxides contemplated herein include the oxides of the above-described metals, preferably the oxides of antimony, calcium and magnesium.

Illustrative metal hydroxides contemplated herein include the hydroxides of the above-described metals, preferably the hydroxides of antimony, calcium and magnesium.

Illustrative hydrates contemplated herein include the oxide hydrates of the above-described metals, preferably the hydrates of aluminum oxide, calcium oxide and magnesium oxide. Especially preferred is alumina trihydrate.

Illustrative salts of the described metals contemplated include the inorganic salts, such as calcium carbonate and magnesium carbonate as well as the bromides and bromates of such metals, e.g., calcium bromate, magnesium bromate and magnesium bromide, as well as the organic salts formed from the described metals with lower aliphatic acids such as formic, acetic, propionic and butyric acids, e.g., calcium acetate, magnesium formate, magnesium acetate, magnesium propionate, magnesium butyrate, calcium acetate, antimony formate and the like.

Especially preferred metal modifiers are Dawsonite, alumina trihydrate, magnesium oxide, magnesium carbonate and antimony oxide.

Especially preferred combinations of $\omega$-bromoalkyl ester and metal modifier are bis(4-bromobutyl) adipate with alumina trihydrate, Dawsonite, magnesium oxide, antimony oxide and magnesium carbonate.

The $\omega$-bromoalkyl esters described above may be used as the sole plasticizer in vinyl halide polymer systems but may also be used in conjunction with conventional plasticizers such as the widely used phthalate and phosphate plasticizers. Thus, the flame retardant plasticizers described in the present invention may be used in combination with phosphate esters such as trialkyl phosphates, dialkyl aryl phosphates, alkyl diaryl phosphates and triaryl phosphates, e.g., tributyl phosphate, trioctyl phosphate, and trialkyl phosphates prepared from mixtures of $C_7$—$C_9$—$C_{11}$ alcohols, dioctyl phenyl phosphate, diisodecyl phenyl phosphate, isopropylphenyl diphenyl phosphate, octyldiphenyl phosphate, t-butylphenyl diphenyl phosphate, isodecyl diphenyl phosphate, cumylphenyl diphenyl phosphate, triphenyl phosphate, cresyl diphenyl phosphate, tricresyl phosphate and the like. Similarly, conventional phthalate plasticizers may be used in the polymer compositions described in the present invention, e.g., mono- and di-alkyl phthalates wherein the alkyl portion of the ester radical contains from 1 to 10 carbon atoms. Further, mixed phthalate esters containing an alkyl ester portion and an aryl ester portion are contemplated, e.g., butyl benzyl phthalate and similar materials. The flame retardant plasticizers of the present invention, whether alone or in combination with conventional plasticizers, are normally incorporated into polymer systems which may contain conventional formulating additives such as fillers, stabilizers, colorants, antioxidants, foaming agents and the like.

Depending upon the particular vinyl halide polymer and the particular $\omega$-bromoalkyl ester plasticizer used, and whether such plasticizer is used alone or in conjunction with conventional plasticizers, the smoke and flame retardant plasticizers of this invention may be incorporated at various concentrations. In general, the $\omega$-bromoalkyl ester plasticizers described are utilized at concentrations of from about 1 to about 100 phr (i.e., parts per hundred parts of resin), preferably from about 5 to about 70 phr and, specifically, from about 15 to about 60 phr.

Similarly, the metal modifier may be utilized at various concentrations depending upon the particular plasticizer or mixture thereof being used. Generally, however, the metal modifiers are used in concentrations of from about 0.5 to about 60 phr, preferably from about 1 to about 30 phr.

The ratio of metal compound to $\omega$-bromoalkyl ester is generally in the range of from about 1:30 to about 4:1, preferably from about 1:10 to about 2:1.

The following examples illustrate specific, non-limiting embodiments of the invention.

In the following examples, certain tests are made, certain terms are used and comparisons are made on the basis of those tests. Accordingly, the following definitions will serve as the basis of an understanding of the examples:

1. "Smoke (percent transmission)" — indicates the minimum percent of light transmitted through smoke at maximum smoke density from film which has been burned in a standardized manner over a predetermined time.
2. "Oxygen Index" — the minimum concentration of oxygen, expressed as volume percent, in a mixture of oxygen and nitrogen that will just support combustion of a material under the conditions of "ASTM-D2863-74". The procedure is used to determine the relative flammability of plastic materials by measuring the minimum concentration of oxygen that will support combustion in a slowly rising mixture of oxygen and nitrogen. The higher the oxygen index, the less flammable is the material.
3. "Flame spread" — determined by use of an asbestos board as a no-flame spread reference. The reach of a flame directed against asbestos is subtracted from the farthest advance of the flame of an ignited test specimen. The result is recorded in centimeters. Construction and calibration of the flame tunnel, and details concerning the flame spread test, are given in the Journal of Paint Technology, volume 39, No. 511, August, 1967. Red oak and asbestos have been assigned flame ratings of 100 and 0, respectively. The lower the flame spread in cm., the less flammable is the material.

EXAMPLE 1

This example illustrates the preparation of bis(4-bromobutyl) adipate. In lieu of 4-bromobutanol, there was used tetrahydrofuran which is converted by 4-bromobutanol in situ by HBr.

To a one liter reactor, equipped with stirrer, thermometer and condenser, there were added 146.2 g. adipic acid, 162 g. tetrahydrofuran and 4 g. p-toluenesulfonic acid with stirring. Over 1.75 hours, there were added 177.4 g. hydrogen bromide, holding the reaction temperature to 30° C. The mixture was then stirred for an additional 0.5 hour and 40 g. benzene was added and the mixture heated to reflux for four hours.

The reaction mixture was cooled and neutralized with aqueous alkali. The ester layer was separated, washed with water and dried. Yield of bis(4-bromobutyl) adipate was 380 g. (91% of theoretical). Substitution of adipic acid and tetrahydrofuran by other dicarboxylic acids and appropriate tetramethylene oxides or brominated alcohols affords the various bis($\omega$-bromoalkyl) esters described above.

EXAMPLE 2

This example illustrates the effectiveness of bis(4-bromobutyl) adipate as a flame retardant plasticizer in PVC as compared with conventional phthalate and phosphate plasticizers, the latter being recognized as flame retardant plasticizers.

Sample sheets (0.06 cm. thick) were formulated as shown in Table 1. The samples were tested for oxygen index and the data are shown in Table 1.

TABLE 1

| Ingredients (Pts. by Wt.) | SAMPLE NUMBER | | |
|---|---|---|---|
| | 1 | 2 | 3 |
| Polyvinyl chloride[1] | 100 | 100 | 100 |
| Phthalate[2] | 50 | | |
| Phosphate[3] | | 50 | |
| 4-BBA[4] | | | 50 |
| Epoxidized soya oil | 3 | 3 | 3 |
| Ba/Cd stabilizer | 2 | 2 | 2 |
| Lead sulfate stabilizer | 5 | 5 | 5 |
| Oxygen Index | 24.3 | 27.9 | 32.7 |

[1]GEON 102 EP (B. F. Goodrich Co.)
[2]SANTICIZER 711 (Monsanto) - mixed heptyl, nonyl, undecyl phthalates
[3]SANTICIZER 148 (Monsanto) - isodecyl diphenyl phosphate
[4]Bis(4-bromobutyl) adipate The data show that bis(4-bromobutyl) adipate is markedly superior to known flame retardant phosphorus-containing plasticizers.

Similar results would be contemplated with ethylene/vinyl chloride and vinyl chloride/acrylonitrile copolymers using bis(2-bromoethyl) adipate, bis(3-bromopropyl) adipate, bis(5-bromopentyl) adipate, bis(6-bromohexyl) adipate, bis(7-bromoheptyl) adipate, bis(8-bromooctyl) adipate, bis(2-bromoethyl) glutarate, bis(3-bromopropyl) pimelate, bis(4-bromobutyl) suberate and bis(5-bromopentyl) azelate.

EXAMPLE 3

This example illustrates the effectiveness, in polyvinyl chloride, of a metal modifier with bis(4-bromobutyl) adipate, alone or combined with conventional plasticizers, as compared to bis(4-chlorobutyl) adipate alone or combined with conventional plasticizers.

Eight samples (0.06 cm. sheets) were formulated as summarized in Table 2. The samples were tested for oxygen indices. The results are shown in Table 2.

TABLE 2

| Ingredients (Parts by Weight) | SAMPLE NUMBER | | | | | | | |
|---|---|---|---|---|---|---|---|---|
| | 1 | 2 | 3 | 4 | 5 | 6 | 7 | 8 |
| Polyvinyl chloride[1] | 100 | 100 | 100 | 100 | 100 | 100 | 100 | 100 |
| Phthalate plasticizer[2] | 50 | | | | 25 | 25 | | |
| Phosphate plasticizer[3] | | 50 | | | | | 25 | 25 |
| 4-BBA[4] | | | 50 | | 25 | | 25 | |
| 4-CBA[5] | | | | 50 | | 25 | | 25 |
| Epoxidized soya oil | 3 | 3 | 3 | 3 | 3 | 3 | 3 | 3 |
| Lead sulfate stabilizer | 5 | 5 | 5 | 5 | 5 | 5 | 5 | 5 |
| Ba/Cd stabilizer | 2 | 2 | 2 | 2 | 2 | 2 | 2 | 2 |
| MgCO$_3$ | 15 | 15 | 15 | 15 | 15 | 15 | 15 | 15 |
| Oxygen Index | 24.8 | 26.8 | 36.0 | 27.3 | 28.1 | 26.0 | 30.8 | 26.9 |

[1]GEON 102 EP
[2]SANTICIZER 711
[3]SANTICIZER 148
[4]Bis(4-bromobutyl) adipate
[5]Bis(4-chlorobutyl) adipate The data indicate that MgCO$_3$ combined with bis(4-bromobutyl) adipate is far more effective than MgCO$_3$ combined with bis(4-chlorobutyl) adipate or with conventional phthalate and phosphate plasticizers. It is further shown that when a metal modifier like MgCO$_3$ is combined with a mixture of bis(4-bromobutyl) adipate and another plasticizer, the formulation containing both MgCO$_3$ and bis(4-bromobutyl) adipate is far superior.

Comparable results would be expected if the following compounds were used in lieu of bis(4-bromopropyl) adipate: bis(2-bromoethyl) adipate, bis(3-bromobutyl) adipate, bis(2-bromoethyl) pimelate and bis(2-bromoethyl) suberate.

EXAMPLE 4

This example illustrates the effectiveness of bis(4-bromobutyl) adipate as a flame and smoke retardant plasticizer in polyvinyl chloride containing calcium carbonate and magnesium carbonate as compared to polyvinyl chloride formulations containing conventional phthalate and phosphate plasticizers containing the same metal compounds.

Six samples (0.03 cm, films) were burned in the Monsanto two-foot tunnel and tested for flame spread and smoke emission. The results are summarized in Table 3.

TABLE 3

| Ingredients (Parts by Weight) | SAMPLE NUMBER | | | | | |
|---|---|---|---|---|---|---|
| | 1 | 2 | 3 | 4 | 5 | 6 |
| Polyvinyl chloride[1] | 100 | 100 | 100 | 100 | 100 | 100 |
| Phthalate[2] | 50 | | | 50 | | |
| Phosphate[3] | | 50 | | | 50 | |
| 4-BBA[4] | | | 50 | | | 50 |
| CaCO$_3$ | 30 | 30 | 30 | | | |
| MgCO$_3$ | | | | 30 | 30 | 30 |
| Epoxidized soya oil | 3 | 3 | 3 | 3 | 3 | 3 |
| Ba/Cd stabilizer | 2 | 2 | 2 | 2 | 2 | 2 |
| Flame Spread (cm.) | 24.9 | 14.5 | 8.1 | 13.7 | 9.1 | 5.8 |
| Min. % transmission | 20 | 39 | 59 | 47 | 67 | 72 |

[1]GEON 102 EP (B. F. Goodrich Co.)
[2]SANTICIZER 711 (Monsanto Company)
[3]SANTICIZER 148 (Monsanto Company)
[4]Bis(4-bromobutyl) adipate The data indicate that bis(4-bromobutyl) adipate combined with CaCO$_3$ of MgCO$_3$ imparts lower flame spread and lower smoke emission than conventional plasticizers in combination with MgCO$_3$ and CaCO$_3$.

Comparable results were contemplated if the following compounds were used in lieu of bis(4-bromobutyl) adipate: bis(5-bromopentyl) adipate, bis(bromomethyl) pimelate, bis(3-bromopropyl) glutarate, bis(4-bromobutyl) pimelate and bis(2-bromoethyl) suberate.

Similar benefits are contemplated by using the fire retardants of the invention in ethylene/vinyl chloride/acrylonitrile and ethylene/vinyl chloride/acrylic terpolymers.

EXAMPLE 5

This example illustrates the relative flame retardant efficiency of bis(4-bromobutyl) adipate in PVC when combined with various metal modifiers.

Four sheets (0.06 cm. thick) were formulated and tested for oxygen index. The formulations and testing data are summarized in Table 4.

TABLE 4

| Ingredients (Pts. by Wt.) | SAMPLE NUMBER | | | |
|---|---|---|---|---|
| | 1 | 2 | 3 | 4 |
| Polyvinyl chloride[1] | 100 | 100 | 100 | 100 |
| Phthalate[2] | 40 | | | |
| 4-BBA[3] | | 40 | 40 | 40 |
| Lead sulfate stabilizer | 5 | 5 | 5 | 5 |
| Alumina trihydrate | 30 | 30 | | |
| CaCO$_3$ | | | 30 | |
| MgCO$_3$ | | | | 30 |
| Epoxidized soya oil | 3 | 3 | 3 | 3 |
| Oxygen Index | 28.1 | 42.7 | 32.2 | 43.8 |

[1]GEON 102 EP
[2]SANTICIZER 711
[3]Bis(4-bromobutyl) adipate

The data show that metal modifiers combined with bis(4-bromobutyl) adipate are far superior to conventional phthalate plasticizer combined with modifier.

Samples 2 and 4 show oxygen indices which are approximately the oxygen index of unplasticized PVC. Such data are unexpected.

EXAMPLE 6

The following formulation is prepared:

| Ingredients | Parts by Weight |
|---|---|
| Polyvinyl chloride | 100 |
| Bis(4-BBA) | 40 |
| MgCO$_3$ | 12 |
| Lead sulfate | 5 |
| Epoxidized soya oil | 3 |
| Ba/Cd stabilizer | 2 |

When a sheet sample (0.06 cm. thick) of the above formula was prepared and burned, it showed an oxygen index of 43.8. Such results are far superior to any presently known fire retardants and is approximately the oxygen index of unplasticized PVC. It was heretofore unknown and therefore unexpected that a plasticized PVC composition could be made which, when burned, would have the approximate oxygen index of unplasticized PVC.

The vinyl halide polymers in which the ω-bromoalkyl ester plasticizers of the invention are utilized are vinyl halide polymers in the form of milled products, plastisols and foams. The vinyl halide polymers can be simple homopolymers of vinyl chloride or copolymers or terpolymers in which the essential polymeric structure of polyvinyl chloride is interspersed at intervals with residues of other ethylenically unsaturated compounds copolymerized therewith. The essential properties of the polymeric structure of polyvinyl chloride is retained if not more than about 40 percent of the comonomer is copolymerized therewith. Comonomers which may be copolymerized with the vinyl chloride include ethylene, acrylonitrile, acrylic acid and its esters, acrylamide and the like.

Especially preferred copolymers include ethylene/vinyl chloride and vinyl chloride/acrylonitrile copolymers. Especially preferred terpolymers include ethylene/vinyl chloride/acrylonitrile, ethylene/vinyl chloride/acrylic acid and ethylene/vinyl chloride/acrylamide terpolymers.

Additionally, the flame and smoke retardant plasticizers of the invention may be utilized in polyurethanes, vinyl/nitrile rubber, polychloroprene and ethylene/vinyl acetate copolymers.

In addition to the metals previously described, the ω-bromoalkyl esters of the invention may be combined with the oxides, hydroxides, hydrates or salts of metals such as vanadium, chromium, molybdenum, tungsten, manganese, iron, cobalt, nickel, palladium, platinum, copper, zinc, mercury, germanium, tin and lead.

The ω-bromoalkyl esters of the invention may also be combined, either alone or in admixture with the described metal modifiers, with other flame retardant and smoke retardant materials and char-forming materials, such as copolymers of ω-bromoalkyl fumarates, e.g., copolymers of bis(4-bromobutyl) fumarate with triallyl cyanurate, vinyl acetate or ethyl acrylate, with ethylene/maleic anhydride adducts and complexes or salts thereof with metals and metal salts such as iron, antimony, tin, zinc and copper, with adducts of furan and maleic anhydride and brominated derivatives thereof. Also, ω-bromoalkyl esters of monocarboxylic acids may be combined with the esters of the present invention.

What is claimed is:

1. A composition comprising a vinyl halide polymer and an ω-bromoalkyl ester of an aliphatic dicarboxylic acid of the formula

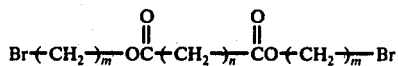

wherein $m$ represents an integer from 1 to 8 and $n$ represents an integer from 4 to 6.

2. Composition of claim 1 wherein said ester is bis(ω-bromoalkyl) adipate.

3. Composition of claim 2 wherein said ester is bis(2-bromoethyl) adipate.

4. Composition of claim 2 wherein said ester is bis(3-bromopropyl) adipate.

5. Composition of claim 2 wherein said ester is bis(4-bromobutyl) adipate.

6. Composition of claim 2 wherein said ester is bis(5-bromopentyl) adipate.

7. Composition of claim 2 wherein said ester is bis(6-bromohexyl) adipate.

8. Composition of claim 2 wherein said ester is bis(7-bromoheptyl) adipate.

9. Composition of claim 2 wherein said ester is bis(8-bromooctyl) adipate.

10. Composition of claim 1 wherein said ester is bis(ω-bromoalkyl) pimelate.

11. Composition of claim 1 wherein said ester is bis(ω-bromoalkyl) suberate.

* * * * *

UNITED STATES PATENT AND TRADEMARK OFFICE
CERTIFICATE OF CORRECTION

PATENT NO. : 4,104,233
DATED : August 1, 1978
INVENTOR(S) : Thomas C. Mathis, Albert W. Morgan and William Vanderlinde It is certified that error appears in the above-identified patent and that said Letters Patent are hereby corrected as shown below:

Column 1, line 65, "107" should be corrected to read -- ω --.

Signed and Sealed this

Thirteenth Day of February 1979

[SEAL]

Attest:

RUTH C. MASON
Attesting Officer

DONALD W. BANNER
Commissioner of Patents and Trademarks